April 18, 1950        W. R. ISOM        2,504,529

MECHANICAL SPEED CHANGER

Filed Sept. 19, 1946        2 Sheets—Sheet 1

INVENTOR.
Warren R. Isom
BY C. D. Tuska
ATTORNEY

April 18, 1950 W. R. ISOM 2,504,529
MECHANICAL SPEED CHANGER
Filed Sept. 19, 1946 2 Sheets—Sheet 2

INVENTOR.
Warren R. Isom
BY
ATTORNEY

Patented Apr. 18, 1950

2,504,529

UNITED STATES PATENT OFFICE 2,504,529

MECHANICAL SPEED CHANGER

Warren R. Isom, West Collingswood, N. J., assignor to Radio Corporation of America, a corporation of Delaware Application September 19, 1946, Serial No. 698,044

9 Claims. (Cl. 74—242.5)

This invention relates to mechanical drive systems, and particularly to a variable speed belt and pulley arrangement for motion picture apparatus.

In the 16 mm. field of motion picture reproduction, there are two types of motion picture film; namely, silent picture film and sound picture film. The silent pictures may be those produced prior to the advent of sound and those taken by amateurs for home use. However, at the present time, most 16 mm. commercial film produced also includes a sound track. In the photographing of silent picture film, the film is generally advanced at a slower speed than the sound film, which means that it must be projected at the same slow speed. Sound film is advanced at a faster rate during recording and reproduction because of the improvement obtained in the reproduced sound. Therefore, to enable a single projector to be used for both types of film, the speed of advancement of the film should be under control.

It is also well-known that the power supply in different communities varies with respect to frequency, some communities, for example, having fifty cycle and others sixty cycle alternating current, and with preferred types of motors, the motor speed is largely determined by the frequency of the power supply. If a projector is to be designed to operate satisfactorily, sometimes with one and sometimes with the other power frequency, the driving system must be appropriately adjustable, so that under all conditions the projector can be operated at the correct speed. Variable speed motors for motion picture projectors are known. However, in sound film reproduction, the advancement of the film past the translation point must be at a constant speed to prevent sound distortion, and, thus, a constant speed motor is considered essential. Adjustable governors have been employed and applied to inherently variable speed types of motors. However, this construction is expensive and less satisfactory than the use of motors which are of the essentially constant speed type.

The present invention is directed, therefore, to a speed changing device which permits the motor to be operated at a constant speed, while the speed of the film is selected at the option of the operator, between several constant values, or alternatively, the mechanism may be operated at a desired speed and the driving ratio altered to compensate for the changed motor speed when the power supply is changed to one of a different frequency. A belt is employed which may be shifted between stepped pulleys to obtain the required speed. To obtain such a practical belt shifting device, the characteristics of flat belts to run to the high side of pulleys and the use of climbing areas between the various steps of the pulleys is utilized. In this manner, a belt shifter which is economical and which may quickly shift the belt from one set of running surfaces to another is provided.

The principal object of the invention, therefore, is to facilitate the changing of the speed of film driving mechanisms.

Another object of the invention is to provide a simple and easily operated belt shifting mechanism.

A further object of the invention is to provide a plurality of speed ratios between a motor and a film advancing mechanism by shifting the driving ratio between the mechanism and the motor.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Figure 1:
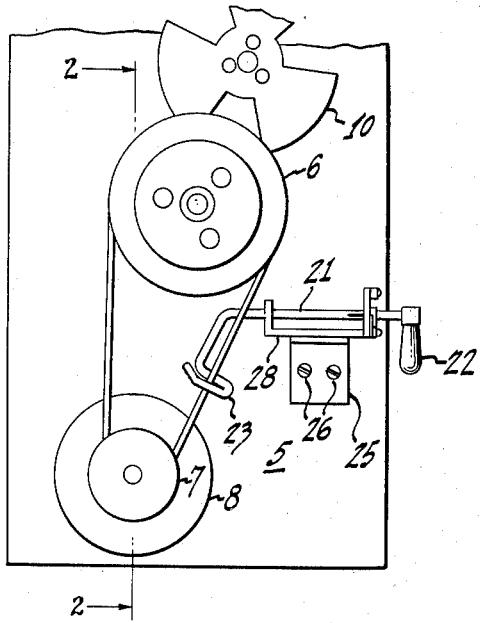
Fig. 1 is a side elevational view of one modification of the invention.

Referring now to the drawings, in which the same numerals identify like elements, a back frame plate 5 has a large stepped pulley 6 and a small driving pulley 7, the pulley 7 being mounted on the shaft of a motor 8. The plate 5 is the main mounting plate for a motion picture projector, and the shutter thereof is shown at 10. It will be noted that in Figs. 2, 3, 6, 7, 9, and 10, the pulley 6 has a large diameter crowned surface 12, and a smaller diameter crowned surface 13. Oppositely arranged on pulley 7 is a large diameter crowned driving surface 15 and a smaller diameter crowned driving surface 16, the pulley 6 having end guide flanges 18, and the pulley 7 having end guide flanges 17. Between the surfaces 12 and 13 of pulley 6, is a climbing zone 19 of substantially the same width as that of the surfaces 12 and 13, while a similar zone 20 is found on the pulley 7. The crowned running surfaces 12, 13, 15, and 16 are of such diameters as to provide the desired speed ratios, and also maintain the belt at satisfactory tension, in whichever position it is operating. Meeting this requirement calls, in the design of the system, for choosing a shaft spacing and belt length and calculating the pulley diameters, instead of the customary choice of diameters, and then calculation of belt length. The transition zones also are so designed with respect to the pulley sizes that the belt is always tight when being shifted from one set of operating surfaces to the other.

As shown in Figs. 1, 2, 3, and 4, the belt is nudged or urged from one set of surfaces 12—16 to the other set of surfaces 13—15 by a crank 21 having a handle 22 and a U-shaped shifter end 23. The arm 21 is attached to the frame plate 5 by a bracket 25 and screws 26 supporting a U-shaped bearing member 28. An arm 30 is fixedly attached to the rod 21 adjacent the handle 22, the end of the arm 30 being connected with a C-shaped toggle spring 31 to the end of the bearing member 28. This type of spring toggle is disclosed in U. S. Patent No. 2,219,731 of October 29, 1910. The function of the spring is to hold the shifter 21 in either of its two operating positions, although it is to be understood that any other type of friction catch or toggle device may be employed. Furthermore, although the rod 21 is shown operated manually by the handle 22, it is realized that the shifter may be operated remotely, such as by an electric solenoid.

As shown in the end views in the drawings, the shifter does not lead the belt on the climbing area or cone. The shifter holds the belt in misalignment until one edge has reached the ridge which separates the cone from the larger diameter surface of the pulley on which the belt is forced to climb. Once this point is reached, the climbing tendency of that end of the belt becomes predominate, and, at the moment that the other end is losing its grip on the cone of the other pulley due to its being forced by the shifter to cross the valley between the small diameter surface and the cone. The ridge gives the end of the belt, which is climbing in the direction that the shift is made, an advantage due to the nature of the surface. The moment it attains that advantage, however, the belt practically jumps to its new stable running position.

The conical portions of the pulleys which I have called the climbing areas must not have a steepness greater than a certain angle which is related to the coefficient of friction between the belt and the surface. If the steepness is too great, the belt will slide back rather than climb. A sufficiently small angle is always possible by lengthening the cone, but it is obviously undesirable to increase the total size in this manner more than is necessary. The greater the coefficient of friction, the shorter and steeper may be the conical portion. Belts of rubber and fabric work particularly well because of the high coefficient of friction between the belt and a metal or other pulley surface, and it is important that the surface shall not be permitted to become oily. The angle between the cone element and axis must be substantially less than the angle of repose as determined by the friction coefficient.

Figure 2:
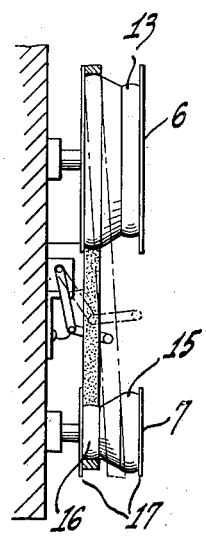
Fig. 2 is an end elevational view of the modification shown in Fig. 1.
Figure 3:
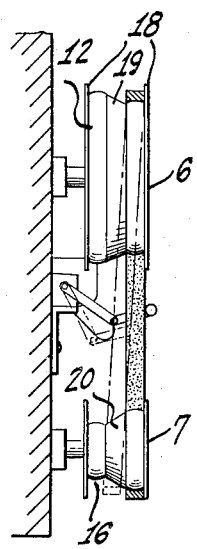
Fig. 3 is an end elevational view similar to Fig. 2 showing the belt in a second position.
Figure 4:
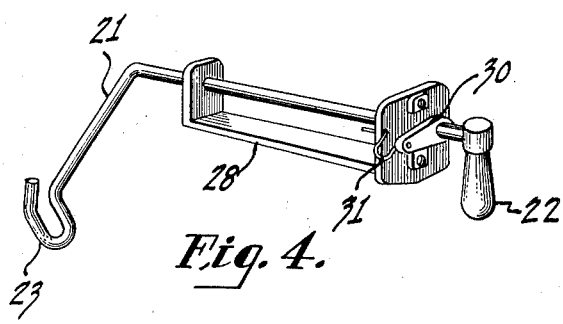
Fig. 4 is a perspective view of the belt shifting arm.
Figure 5:
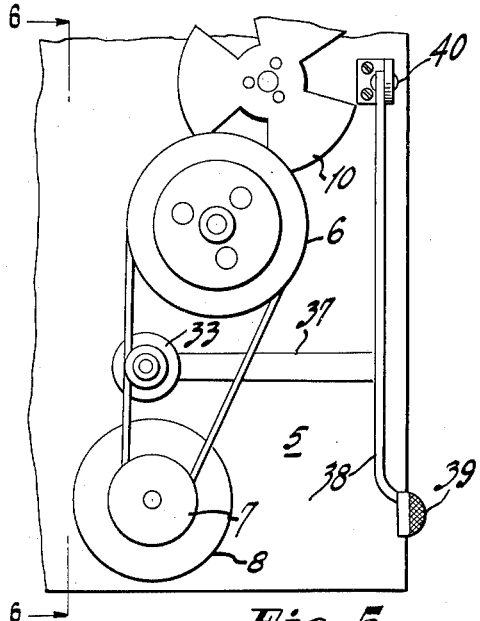
Fig. 5 is a side elevational view of a second modification of the belt shifting mechanism.
Figure 6:
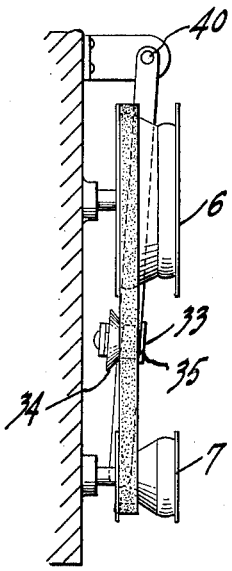
Figs. 6 and 7 are end elevational views of the modification of Fig. 5 showing the belt in two different positions.
Figure 7:
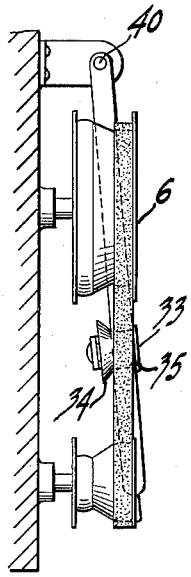

Referring now to Figs. 5, 6, and 7, the same driving mechanism is shown as in Figs. 1, 2, and 3, except that the belt shifting element is an idler pulley 33 having a coned flange 34 on one side and a right angle flange 35 on the other side. The idler pulley 33 is mounted on an arm 37 attached to a lever 38 with a hand knob 39. In this shifting arrangement, the belt may be urged from one set of driving surfaces to the other simply by swinging the knob 39 on its pivot 40. Due to the configurations and the shaping of the pulleys, the belt is quickly and easily shifted with the lever 38. The use of an idler makes it less essential to design the pulleys for exactly equal belt lengths in the several running positions.

Figure 8:
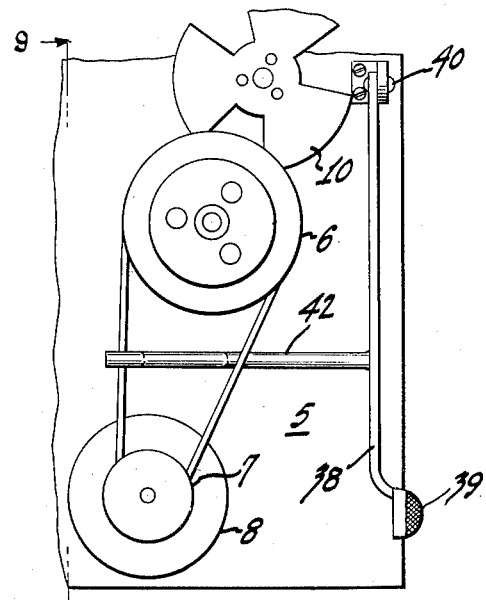
Fig. 8 is a side elevational view of a third modification of the belt shifting element of the invention.
Figure 9:
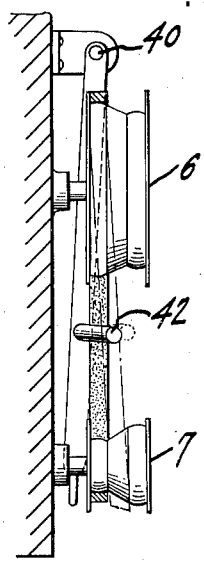
Figs. 9 and 10 are end elevational views of the modification shown in Fig. 8.
Figure 10:
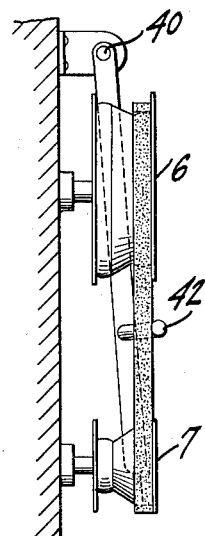

Referring now to Figs. 8, 9, and 10, a third shifting element is shown comprising the arm 38 and hand knob 39 of the modification shown in Figs. 5, 6, and 7, but the actual element which contacts the belt is an S-shaped rod 42 which is inserted between two free portions of the belt. Thus, the operation of this shifting element is the same as that in Figs. 5, 6, and 7, and may be employed in cases where the space requirement would not permit the use of the other mechanisms.

It is to be understood that a suitable idler pulley may be applied to the belt between the pulleys 6 and 7 to maintain the proper tightness and friction between the belt and crowned pulley surfaces. The motor may be any constant speed motor, the shift lever being positioned in one position when silent film is to be projected, and swung to its other position when sound film is to be projected. The pulley ratios may also be designed to provide a constant film speed for fifty and sixty cycle power sources. The shifting operation may be made very quickly with assurance that the belt will readily shift itself with a slight urging of the shifting element and then provide stable operation in its shifted position.

It is obvious that the system of my invention is not limited to two speed ratios, but may be extended to as many as may be needed, nor is it necessary that the ratios be in a continuous progression, although this is desirable.

It is also obvious that the application of the invention is not limited to projectors, but may be to any driven device for which a plurality of discrete speed values is wanted.

I claim:

1. A belt shifting mechanism comprising a pulley having a plurality of crowned surfaces of different diameters, a second pulley having crowned surfaces of different diameters and aligned with the surfaces of said first pulley, a belt adapted to run over predetermined pairs of said surfaces at mutually exclusive periods, a tapered climbing zone intermediate the crowned surface of each of said pulleys, and means in one belt loop for urging said belt toward either climbing zone of the surface to which said belt is to be shifted, said belt thereby shifting from one pulley surface to another co-axial pulley surface by climbing from one surface to the other surface.

2. A belt shifting mechanism in accordance with claim 1, in which said belt shifting means comprises a crank arm having a single U-shaped element through which one loop of said belt runs, said element being positioned substantially midway between said pulleys, and means for maintaining said crank arm in two limiting positions of operation of said belt.

3. A belt shifting mechanism in accordance with claim 1, in which said last mentioned means includes a single S-shaped shifter bar adjacent opposite sides of said belt positioned substantially mid-way between said pulleys.

4. In a motion picture projector adapted to be driven by a constant speed motor, a stepped pulley driven by said motor, said pulley having two crowned surfaces of different diameters spaced by a climbing cone surface between said crowned surfaces, a shaft parallel with the shaft of said motor, a second stepped pulley mounted on said shaft, said second pulley having a pair of crowned surfaces spaced by a climbing zone between said crowned surfaces of said second pulley, the larger crowned surface of said second pulley being aligned with the smaller crowned surface of said first pulley, a belt adapted to connect said pulleys, and means in one loop for urging said belt toward the climbing zone surface to which said belt is to be shifted, said belt thereby shifting from one pulley surface to an adjacent co-axial pulley surface by climbing from one surface to the other surface.

5. A motion picture projector in accordance with claim 4, in which the width of the climbing zone is substantially the width of the crowned surfaces and of said belt.

6. A variable speed driving mechanism comprising a driving pulley having a pair of crowned surfaces of different diameters and of predetermined width, a conical climbing zone intermediate said crowned surfaces and having a width substantially that of said crowned surfaces, a second pulley aligned with said first pulley and having a pair of crowned surfaces of different diameters arranged in an opposite relationship to said first pulley, and a conical climbing zone intermediate said crowned surfaces of said second pulley of a width substantially the same as that of the cone surface of said first pulley, and means in one belt loop for urging said belt toward either climbing zone of the surface to which said belt is to be shifted, said belt thereby shifting from one pulley surface to the adjacent co-axial pulley surface by climbing from one surface to the other surface.

7. A driving mechanism in accordance with claim 6, in which said last mentioned means is a crank arm having one end contacting both edges of one loop of said belt and positioned substantially mid-way between said driven and second pulleys, and means for maintaining said crank arm in two operating positions of said belt.

8. A driving mechanism in accordance with claim 6, in which said last mentioned means is a roller for contacting both edges of one loop of said belt and positioned substantially mid-way between said driving and second pulleys for urging said belt to the climbing zone of the surface to which said belt is to be shifted and for maintaining a predetermined tension in said belt.

9. A power transmission system comprising a shaft, a pulley on said shaft having a plurality of substantially cylindrical surfaces of different diameters, a second shaft parallel to said first shaft, a second pulley on said second shaft and having a corresponding plurality of substantially cylindrical surfaces in alignment with corresponding surfaces on said first pulley, said surfaces being adapted to work in pairs with a belt, the diameters of said cylindrical portions being chosen to operate satisfactorily with a single belt length, both of said pulleys having conical portions between their cylindrical portions, said conical portions being of such length that the angle between the cone element and axis shall be substantially less than the angle of friction between the belt and the surface of said conical portions, in the cases of all of said conical portions, and means in one loop of said belt intermediate said pulleys for exerting a sidewise push on said belt whereby said belt is caused to move from one pair of cylindrical surfaces toward another pair in either direction, said belt climbing the climbing zone toward which it is directed.

WARREN R. ISOM.

REFERENCES CITED

The following references are of record in the file of this patent:

UNITED STATES PATENTS

| Number | Name | Date |
| --- | --- | --- |
| 1,283,625 | Bancroft et al. | Nov. 5, 1918 |
| 1,311,095 | Siren et al. | July 22, 1919 |

OTHER REFERENCES

Artoflex Engineering Works Ltd., 178, 795, June 29, 1922.